(12) United States Patent
Lee

(10) Patent No.: US 7,816,297 B2
(45) Date of Patent: Oct. 19, 2010

(54) CHEMICAL PROCESSING OF NANOPARTICLES

(75) Inventor: Kwangyeol Lee, Namyangju-si (KR)

(73) Assignee: Korea University Research and Business Foundation (KR)

( * ) Notice: Subject to any disclaimer, the term of this patent is extended or adjusted under 35 U.S.C. 154(b) by 17 days.

(21) Appl. No.: 12/201,990

(22) Filed: Aug. 29, 2008

(65) Prior Publication Data

US 2010/0056363 A1 Mar. 4, 2010

(51) Int. Cl.
*B01J 23/38* (2006.01)
(52) U.S. Cl. ..................................... 502/167
(58) Field of Classification Search .................. None
See application file for complete search history.

(56) References Cited

U.S. PATENT DOCUMENTS

| 7,335,245 | B2 * | 2/2008 | He et al. ...................... 75/351 |
| 2008/0134836 | A1 * | 6/2008 | Brooks et al. ................. 75/351 |

OTHER PUBLICATIONS

Jimenez et al, the state of the oxygen at the surface of polycrystalline cobalt oxide, 1995, Journal of electron spectroscopy and related phenomena, vol. 71, pp. 61-71.*
Dickinson et al, Formation mechanism of porous single crysal Cr2O3 and CoO4 templated by mesoporous silica, 2006, Chemical Materials, vol. 18, pp. 3088-3095.*

Corr, et al., Linear Assemblies of Magnetic Nanoparticles as MRI Contrast Agents; J. Am. Chem. Soc., 2008, vol. 130, No. 13, pp. 4214-4215.
Guo et al., Patterned Langmuir-Blodgett Films of Monodisperse Nanoparticles of Iron Oxide Using Soft Lithography; J. Am. Chem. Soc., 2003, vol. 125, pp. 630-631.
Jun, et al., Nanoscale Size Effect of Magnetic Nanocrystals and Their Utilization for Cancer Diagnosis via Magnetic Resonance Imaging; J. Am. Chem. Soc., 2005, vol. 127, pp. 5732-5733.
Kim et al., Synthesis of Hollow Iron Nanoframes; J. Am. Chem. Soc., 2007, vol. 129, pp. 5812-5813.
Kim et al., Quantitative Assessment of Nanoparticle Single Crystallinity: Palladium-Catalyzed Splitting of Polycrystalline Metal Oxide Nanoparticles; Angew. Chem. Int. Ed, 2009, vol. 48, pp. 5129-5133.
Kim, et al., Synthesis of Monodisperse Palladium Nanoparticles; Nano Letters, 2003, vol. 3, No. 9, pp. 1289-1291.
Kovalenko, et al., Fatty Acid Salts as Stabilizers in Size- and Shape-Controlled Nanocrystal Synthesis: The Case of Inverse Spinel Iron Oxide; J. Am. Chem. Soc., 2007, vol. 129, pp. 6352-6353.
Lee, et al., Artifically engineered magnetic nanoparticles for ultrasensitive molecular imaging; Nature Medicine, Jan. 2007, vol. 13, No. 1, pp. 95-99.

(Continued)

*Primary Examiner*—Melvin C Mayes
*Assistant Examiner*—Stefanie Cohen
(74) *Attorney, Agent, or Firm*—Knobbe Martens Olson & Bear, LLP

(57) ABSTRACT

Disclosed is a method of processing a polycrystalline nanoparticle. The method includes exposing a polycrystalline nanoparticle that includes at least two metal oxide crystallites bonded to each other to a chemical composition that includes a catalyst in order to at least partially separate the at least two metal oxide crystallites of the polycrystalline nanoparticle at an interface thereof.

33 Claims, 6 Drawing Sheets

OTHER PUBLICATIONS

Lim, et al., Immobilization of histidine-tagged proteins by magnetic nanoparticles encapsulated with nitrilotriacetic acid (NTA)-phospholipids micelle; Biochemical and Biophysical Research Communications, 2006, vol. 344, pp. 926-930.

Lu, et al., Fabrication of Cubic Nanocages and Nanoframes by Dealloying Au/Ag Alloy Nanoboxes with an Aqueous Etchant Based on Fe(NO3)3 or NH4OH, Nano Letter, 2007, vol. 7, No. 6, pp. 1764-1769.

Murahashi et al., Catalytic Alkyl Group Exchange Reaction of Primary and Secondary Amines; J. Am. Chem. Soc., 1983, vol. 105, No. 15, pp. 5002-5011.

Park, Jongnam et al., Ultra-large-scale syntheses of monodisperse nanocrystals; Nature Materials, Dec. 2004, vol. 3, pp. 891-895.

Shavel, et al., Synthesis and Characterization of Iron/Iron Oxide Core/Shell Nanocubes; Adv. Funct. Mater., 2007, vol. 17, pp. 3870-3876.

Shi, et al., A General Approach to Binary and Ternary Hybrid Nanocrystals; Nano Letters, 2006, vol, 6, No. 4, pp. 875-881.

Sun et al., Size-Controlled Synthesis of Magnetite Nanoparticles; J. Am. Chem. Soc., 2002, vol. 124, No. 28, pp. 8204-8205.

Sun et al., Monodisperse MFe2O4 (M=Fe, Co, Mn) Nanoparticles; J. Am. Chem. Soc., 2004, vol. 126, pp. 273-279.

Wilson Jr., et al, Transalkylation Reaction. Homogeneous Catalytic Formation of C-N Bonds; J. Am. Chem. Soc., 1985, vol. 107, pp. 361-369.

Yang, et al, Multifunctional Magneto-Polymeric Nanohybrids for Targeted Detection and Synergistic Therapeutic Effects on Breast Cancer; Angew, Chem. Int. Ed. 2007, vol. 46, pp. 8836-8839.

Yin et al., Synthesis of Monodisperse Nanocrystals of Manganese Oxides; J. Am. Chem. Soc., 2003, vol. 125, pp. 10180-10181.

Zeng, et al., Shape-Controlled Synthesis and Shape-Induced Texture of MnFe2O4 Nanoparticles; J. Am. Chem. Soc., 2004, vol. 126, pp. 11458-11459.

Zhang, et al., Detection of NO2 down to ppb Levels Using Individual and Multiple In2O3 Nanowire Devices, Nano Letters, 2004, vol, 4, No. 10, pp. 1919-1924.

* cited by examiner

CHEMICAL PROCESSING OF NANOPARTICLES

BACKGROUND

Nanotechnology generally refers to a field of technology that controls matter on an atomic or molecular scale (generally 100 nanometers or smaller). Nanotechnology is used for the fabrication of devices or materials that lie within that scale.

Nanotechnology has been recently developed rapidly for various applications in a number of technology fields. Examples of such fields include, but are not limited to, applied physics, materials science, interface and colloid science, device physics, molecular chemistry, self-replicating machines and robotics, medical devices, chemical engineering, mechanical engineering, biological engineering, and electrical engineering. In certain instances, a structure or material made using nanotechnology can be used in a number of different technology fields.

SUMMARY

An aspect by way of non-limiting example includes methods of processing a polycrystalline nanoparticle. The methods can include, for example, exposing a polycrystalline nanoparticle that includes at least two metal oxide crystallites bonded to each other to a composition, and at least partially separating the at least two metal oxide crystallites of the polycrystalline nanoparticle at an interface thereof. The composition can contain, without being limited thereto, a catalyst that includes at least one noble metal and/or at least one transition metal. The catalyst may include, for example, one or more of palladium, gold, silver, platinum, nickel, combinations of the foregoing and molecules incorporating the foregoing. The catalyst can be a combination of metals, for example, palladium-gold and palladium-platinum.

The composition can further include, for example, a first compound including an amine. The first compound can include, for example, at least one of oleylamine and hexadecylamine. The composition can further include, for example, a second compound of a formula: $PR_1R_2R_3$, wherein at least one of $R_1$, $R_2$ and $R_3$ is selected from the group consisting of an alkyl and an aryl. The second compound can include trioctylphosphine. The exposing can include, for example, forming a mixture of the second compound and the catalyst; and mixing the nanoparticle and the mixture. The exposing can include, for example, mixing the nanoparticle and the first compound to form a first mixture; and agitating the first mixture before adding the second compound and the catalyst. The exposing can include, for example, forming a second mixture of the second compound and the catalyst; and mixing the first mixture and the solution to form a third mixture. The exposing further can include heating the third mixture to have a temperature of about 50° C. to about 400° C. The temperature can be maintained, for example, between about 50° C. and about 400° C. for about 0.5 hour to about 10 hour. The volumetric ratio of the first compound to the second compound may be about 0.5 to about 20. The catalyst may include, for example, $Pd(acac)_2$.

The exposing can include forming an outer layer of the nanoparticle. The outer layer can include an amorphous layer. The nanoparticle includes one or more metal oxide of, for example, $Fe_2O_3$, $Fe_3O_4$, $MnFe_2O_3$, $Mn_2O_3$, ZnO and CoO. The nanoparticle can include a metal bonded to at least one of the at least two nanoparticles. The metal can include noble metal. The metal can include, for example, palladium, platinum, gold, silver, cobalt or combinations thereof.

Another aspect by way of non-limiting example includes methods of determining nanoparticle crystallinity. The methods can include, for example, exposing a population of nanoparticles to a composition; at least partially separating the at least two metal oxide crystallites of the polycrystalline nanoparticles, if present in the population of nanoparticles; and identifying either or both of single crystalline nanoparticles and polycrystalline nanoparticles within the population of nanoparticles. The composition can include, for example, one or more catalysts that include, but are not limited to, at least one noble metal and/or at least one transition metal. The catalyst may include, for example, palladium, gold, silver, platinum, nickel, combinations of the foregoing and molecules incorporating the foregoing. Transition metals can include, for example, any element in the d-block of the periodic table, including zinc, cadmium and mercury, for example. The population of nanoparticles may include single crystalline nanoparticles and/or polycrystalline nanoparticles. The polycrystalline nanoparticles, if present, include at least two metal oxide crystallites bonded to each other.

The catalyst can be a combination of metals, for example, one or more of palladium-gold and palladium-platinum. The catalyst can include metal nanoparticles. The composition can further include a second compound including trioctylphosphine. The exposing can include: forming a solution of the second compound and the catalyst; and mixing the nanoparticles and the solution. The exposing can include, for example, mixing the nanoparticles and the first compound to form a first mixture; and adding the catalyst and a second compound selected from the group consisting of trialkylphosphine, triarylphosphine, and trioctylphosphine to the first mixture. The exposing further can include agitating the first mixture before adding the second compound and the catalyst. The adding can include: forming a solution of the second compound and the catalyst; and mixing the first mixture and the solution to form a third mixture. The exposing can include heating the third mixture to have a temperature of about 50° C. to about 400° C. The temperature can be maintained, for example, between about 50° C. and about 400° C. for about 0.5 hour to about 10 hour.

The first compound can include an aliphatic amine, for example. The first compound can include oleylamine, for example. The composition can further include, for example, a second compound selected from the group consisting of trialkylphosphine, triarylphosphine, and trioctylphosphine. The first compound has a first amount in volume and the second compound has a second amount in volume, wherein the first amount is about 0.5 to about 20 times of the second amount. The catalyst can include $Pd(acac)_2$, for example. The catalyst can include a nanoparticle. The exposing can include forming an outer layer of at least one of the nanoparticles. The outer layer can include an amorphous layer. The identifying can include imaging at least a portion of the population using transmission electron microscopy or high-resolution transmission electron microscopy.

Still another aspect by way of non-limiting example includes kits for chemically processing metal oxide nanoparticles. The kits can include, for example, at least one of a first compound and a second compound. The first compound can include, for example, an amine, and the second compound can include, but is not limited to, a compound of a formula: $PR_1R_2R_3$, wherein P is phosphorous, and wherein at least one of $R_1$, $R_2$ and $R_3$ is an alkyl or an aryl, for example, trialkylphosphine, triarylphosphine, or trioctylphosphine.

The kit can further include a catalyst of at least one of noble metal and transition metal. The catalyst may include, for example, at least one of palladium, gold, silver, platinum, nickel, combinations of the foregoing or molecules incorporating the foregoing. The catalyst can be a combination of metals, for example, one or more palladium-gold and palladium-platinum. The catalyst can include nanoparticles. The second compound can include one selected from the group consisting of selected from the group consisting of trialkylphosphine and triarylphosphine. The second compound can include trioctylphosphine. The kit can further include a container configured to contain nanoparticles, a liquid composition of the catalyst, and the at least one of the first compound and the second compound. The kit can further include an additional container configured to contain a mixture of the second compound and the catalyst.

A further aspect by way of non-limiting example includes nanoparticles, including nanoparticles made by the methods described herein. The nanoparticles can include, for example, at least two metal oxide crystals, and an outer layer at least partially surrounding the at least two metal oxide crystals. The at least two metal oxide crystals and the layer form a single nanoparticle. The at least two metal oxide crystals can be unbonded to each other. Each of the at least two metal oxide crystals may include one or more metal oxide of, for example, $Fe_2O_3$, $Fe_3O_4$, $MnFe_2O_4$, $Mn_2O_3$ and CoO.

One of the at least two metal oxide crystals may form a first single magnetic domain, and the other of the at least two metal oxide crystals may form a second single magnetic domain with a magnetization direction different from that of the first single magnetic domain. The at least two metal oxide crystals does not contact each other. The at least two metal oxide crystals may contact each other. The nanoparticle can include a gap between the at least two metal oxide crystal. The gap can be from about 1 nm to about 4 nm. The gap can be from about 2 nm to about 3 nm. The nanoparticle may include an outer layer. The outer layer can include an amorphous layer. The outer layer may be or is not bonded to each of the at least two metal oxide crystals. The outer layer can include an inner surface bonded to each of the at least two metal oxide crystals.

The nanoparticle can include a metal, for example, palladium, platinum, gold, silver and cobalt. The nanoparticle can include or does not include a gap between the metal and the one of the at least two metal oxide crystals. The foregoing nanoparticles can be used as a catalyst. The catalyst can include the foregoing nanoparticles. The catalyst can be is movable by applying a magnetic field.

A still further aspect by way of non-limiting example includes a method of determining nanoparticle crystallinity. The method, for example, can include exposing a population of inorganic nanoparticles to an etchant. The inorganic nanoparticles can include one or more of one or more single crystalline nanoparticles or one or more polycrystalline nanoparticles, and the polycrystalline nanoparticles, if present, can include at least two crystallites bonded to each other. The method can further include at least partially separating the at least two crystallites of the polycrystalline nanoparticles, if present in the population and identifying one or more of single crystalline nanoparticles or polycrystalline nanoparticles within the population of inorganic nanoparticles.

The identifying can include counting polycrystalline nanoparticles within the population of nanoparticles. The identifying can include imaging at least a portion of the population using, for example, transmission electron microscopy or high-resolution transmission electron microscopy. The inorganic nanoparticles can include one or more nanoparticles of, for example, metal oxides, metals, or metal chalcogenides. The inorganic nanoparticles can include one or more nanoparticles of, for example, $Fe_3O_4$, $Fe_2O_3$, $MnFe_2O_4$, or Pd—$Fe_3O_4$. The population of inorganic nanoparticles can include or does not include a polycrystalline nanoparticle.

The foregoing is a summary and thus contains, by necessity, simplifications, generalization, and omissions of detail; consequently, those skilled in the art will appreciate that the summary is illustrative only and is not intended to be in any way limiting. Other aspects, features, and advantages of the devices and/or processes and/or other subject matter described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
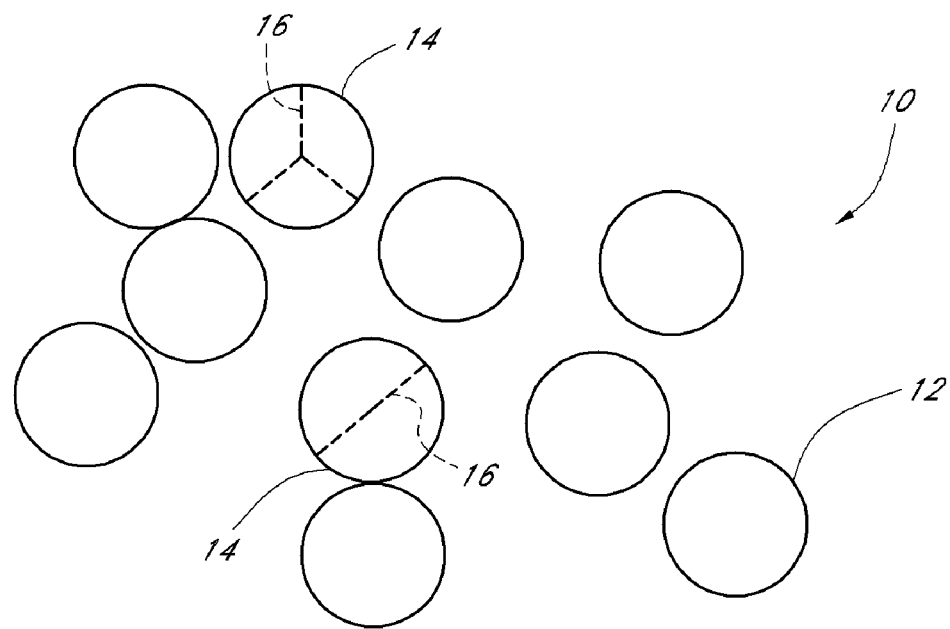
FIG. 1 depicts nanoparticles that are to be processed according to one illustrative embodiment.

In the following detailed description, reference is made to the accompanying drawings, which form a part hereof In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and make part of this disclosure.

Crystalline nanoparticles can be used in various applications. Two non-limiting examples of applications that can utilize high quality nanocrystals are magnetic resonance imaging (MRI) and magnetic bio-separation. Generally, single crystal nanoparticles are desired for the various applications, for example, to have consistent quality of material. The level of single crystallinity can serve as a guide for nanocrystal quality and consistency of properties. A number of synthetic methods have been developed for producing quality nanoparticles with high concentrations of single crystal particles. However, assessing single-crystallinity has been done using mostly qualitative methods. Quantitative methods have been characterized by slow processing times, for example, due to the difficulty in identifying or distinguishing poly and/or monocrystal particles.

This disclosure is drawn, inter alia, to methods, compositions of matter, kits and systems related to processing, making, quantifying and using nanocrystals.

Aspects of the present disclosure relate to methods of chemically processing a nanoparticle. Such methods can include, for example, exposing a nanoparticle to a chemical composition such that the nanoparticle is subjected to a chemical reaction, for example, an "etching" process. During the chemical reaction, two or more crystallites in a nanoparticle can be at least partially separated, split, divided or unbonded at an interface of the crystals. The resulting nanoparticle contains the at least partially separated crystallites. In this disclosure, the "separated" crystals generally indicates "at least partially separated" crystals to "completely separated" crystals, as well as to unbonded, split or divided crystals.

Also, aspects of the present disclosure relate to methods of identifying or determining the crystallinity of nanoparticles. The methods can include quantifying the crystallinity of one or more nanoparticles. The nanoparticles can be processed using a chemical process, for example, etching, to produce nanoparticles for which the level of mono or polycrystallinity can be more easily determined or quantified. For example, the processed nanoparticles can be analyzed using microscopy, including, but not limited to, transmission electron microscopy (TEM) or high resolution TEM (HRTEM). As mentioned above, the chemical processes cause crystallites of a polycrystalline nanoparticle that are bonded to each other to be at least partially separated at an interface there between. Nanoparticles that contain the at least partially separated or unbonded crystals can be readily identified using TEM or HRTEM, for example. In contrast, it is difficult to identify crystallinity of unprocessed nanoparticles where the crystals are still bonded.

In another aspect, nanoparticles can be used as carriers, for example, carriers of a catalytic material. For example, a polycrystal nanoparticle with a catalytic material embedded between bonded crystals can be subjected to a chemical process to separate the bonded crystals within the particle, as described above and elsewhere herein. The resultant nanoparticle can carry the catalytic material, for example, between the at least partially separated crystals. This structure allows the catalyst to be accessible from the outside of the nanoparticles, whereas prior to the separation process the catalytic material was inaccessible.

Methods of Processing Nanocrystals

As mentioned briefly above, aspects of the present disclosure relate to methods of chemically processing a nanoparticle. Such methods can include, for example, exposing a nanoparticle to a chemical composition such that the nanoparticle is subjected to a chemical reaction. During the chemical reaction, two or more crystallites in a nanoparticle can be at least partially separated, split, divided or unbonded at an interface of the crystals. The resulting nanoparticle contains the at least partially separated crystallites.

In one embodiment, a polycrystalline nanoparticle includes two or more crystals or crystallites. Two neighboring crystals among the two or more crystals are generally bonded at an interface thereof. The metallurgical structure can have lattice mismatching at the interface between two crystals. The lattice mismatch can cause instability such that during the chemical reaction, separation or splitting can selectively occur at the interface. Such separation or splitting can occur at least part of all crystal interfaces in the polycrystalline nanoparticle.

In one embodiment, during the chemical reaction, an outer layer is formed at an outer surface of a nanoparticle. This outer layer can at least partially surround a crystal where the nanoparticle is a single crystal particle, and/or at least partially surrounds two or more separated crystals where the nanoparticle is a polycrystalline nanoparticle. In other words, a resultant nanoparticle with polycrystallinity can have two or more crystals at least partially separated from or unbonded to each other at the interfaces and an outer layer which at least partially surrounds the crystals, which will be described further below.

In certain aspects, the nanoparticle can include a metal oxide. The nanoparticle can include a transition metal oxide, for example, iron oxide, cobalt oxide, and the like. As several non-limiting examples, the nanoparticles can include $Fe_2O_3$, $Fe_3O_4$, $MnFe_2O_3$, $Mn_2O_3$, $CoO$, $ZnO$, combinations thereof, and the like.

The chemical composition to which the nanoparticles are exposed can include a catalyst including, for example, at least one noble metal and/or at least one transition metal. For example, the catalyst can include a metal, such as, palladium, gold, silver, platinum, nickel, combinations of the same, and the like. Non-limiting examples of combinations include palladium-gold and palladium-platinum. The catalyst may include metal nanoparticles. In a certain aspects, the catalyst can include $Pd(acac)_2$, but not is limited thereto. In one embodiment, the catalyst, can be, for example nanoparticles of above discussed metal.

In some aspects the chemical composition further can include an etchant compound, for example, a phosphine compound of a formula: $PR_1R_2R_3$, where P is phosphorous, and wherein at least one of $R_1$, $R_2$ and $R_3$ is one of an alkyl and an aryl. Examples of such compounds of formula $PR_1R_2R_3$, include trialkylphosphine, triarylphosphine, trioctylphosphine, combinations thereof, and the like.

Also, in certain aspects, the chemical composition further can include a surfactant, for example, an amine. The surfactant compound may include, but is not limited to, an aliphatic amine, for example, oleylamine and hexadecylamine. In one embodiment, an amine having a boiling point higher than about 200° C. can be used.

A volumetric ratio of the surfactant, in one embodiment, to the etchant compound can be, for example, about 0.5 to about 20. In certain embodiments, the volumetric ratio can be, for example, about 0.5, about 1, about 2, about 3, about 5, about 7, about 8, about 8.5, about 9, about 9.5, about 10, about 12, about 15, about 20. In some embodiments, the volumetric ratio may be within a range defined by two of the foregoing ratios.

Exposing the nanoparticles to a chemical composition in order to process the nanoparticles can include heating and or maintaining the temperature of the materials at about 50° C. to about 400° C. from about 0.5 hour to about 10 hour, for example, in a hot oil bath. In certain embodiments, the temperature can be, for example, about 50° C., about 70° C., about 100° C., about 150° C., about 170° C., about 185° C., about 200° C., about 220° C., about 250° C., about 280° C., about 300° C., about 330° C., about 350° C., or about 400° C. In some aspects, the temperature may be within a range defined be two of the foregoing temperatures. In some aspects the temperature can be maintained for a period of about 0.5 hour, about 0.8 hour, about 1 hour, about 1.2 hours, about 1.4 hours, about 1.6 hours, about 1.7 hours, about 1.9 hours, about 2 hours, about 2.3 hours, about 2.5 hours, about 2.7 hours, about 3 hours, about 4 hours, about 4.5 hours, about 5 hours, about 6 hours, about 7 hours, about 8 hours, about 9 hours, or about 10 hours. In some aspects, the foregoing temperature can be maintained for a time period within a range defined be two of the foregoing periods.

In a process according to one embodiment, polycrystalline nanoparticles can be added to a liquid surfactant, for example, oleylamine, so as to form a first mixture. This mixture further may be stirred, shaken or agitated by applying sound or ultrasound to enhance contact between the surfactant and surfaces of the nanoparticles. A second mixture or separate solution is formed by adding a catalyst, for example, $Pd(acac)_2$, to an etchant compound, for example, trioctylphosphine. Subsequently, the solution of $Pd(acac)_2$ and trioctylphosphine is mixed with the first mixture to form a third mixture. The third mixture can be heated to a temperature described above. The temperature of the mixture can be maintained for a period of time described above.

Processed nanoparticles as described herein can be removed from the third mixture, used and/or analyzed (as discussed herein).

FIG. 1 shows a mixture of nanoparticles 10. Some are single crystalline nanoparticles 12. Others are polycrystalline nanoparticles 14, which for convenience use dotted lines to show illustrative interfaces 16 between the crystals in the nanoparticles. Two or more crystals of each polycrystalline nanoparticle 14 are bonded or joined to each other at the interfaces. For example, the bond can be an ionic bond, a covalent bond, a bond due to Van der Waals forces, or the like. It is generally difficult to indentify or determine the crystallinity of polycrystalline nanoparticles 14. In particular, distinguishing polycrystalline nanoparticles that have not been processed as described herein can be very difficult and time consuming.

Figure 2:
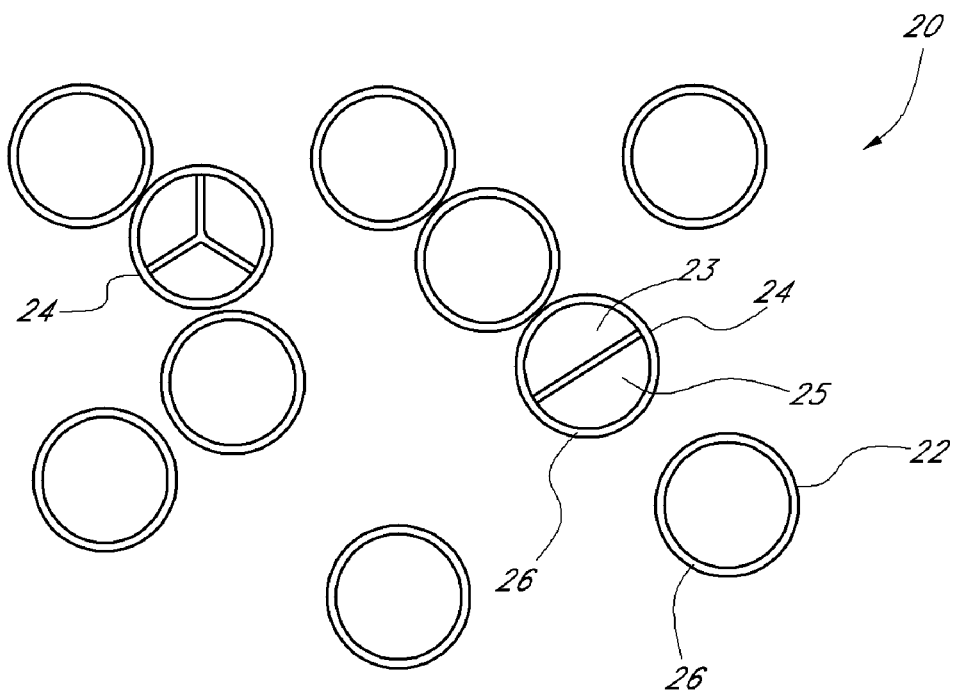
FIG. 2 depicts nanoparticles that have been subjected to a chemical process according to one illustrative embodiment.

FIG. 2 depicts resultant nanoparticles 20 after chemical processing. The nanoparticles 20 include single crystalline nanoparticles 22 and resultant polycrystalline nanoparticles 24. Actual images of such processed nanoparticles can be obtained by imaging at least a portion of the resultant nanoparticles using e.g. TEM or HRTEM.

As shown in FIG. 2, resultant polycrystalline nanoparticles 24 has two or more crystals 23 and 25 completely separated from each other or unbonded to each other at the interfaces. The separation can be readily observed in a TEM image. Contrastingly, resultant single crystalline nanoparticles 22 remain a single crystal even after the chemical reaction. As such, the crystallinity of nanoparticles 20 can be determined.

In an illustrative embodiment shown in FIG. 2, the resultant nanoparticles 22 and 24 that have been subjected to a chemical process as discussed herein include an outer layer 26. In one embodiment, the outer layer 26 is formed at the beginning of the chemical reaction and is formed of an amorphous structure of some elements including, but not limited to, one or more of phosphorus, oxygen, carbon, and metal (for example iron). This outer layer 26 at least partially surrounds the single crystal of the resultant single crystalline nanoparticles 22 or the two or more crystals of the resultant polycrystalline nanoparticles 24 and maintains the integrity of the polycrystalline nanoparticles 24, for example. In one embodiment, the outer layer 26 has an inner surface bonded to the separated crystals of nanoparticle 24. Alternatively, the inner surface of the outer layer is not bonded to the crystals of nanoparticle 24. In one embodiment, the outer layer is porous.

Figure 3A:
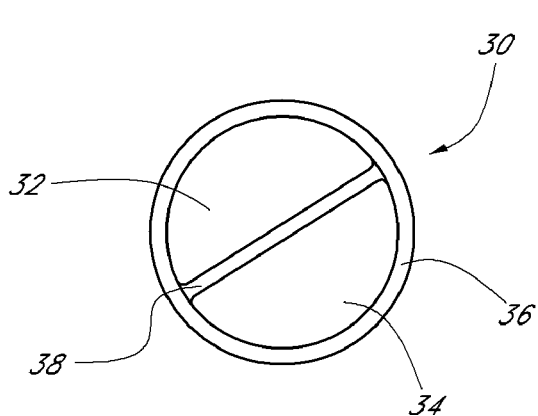
FIGS. 3A and 3B show illustrative examples of nanoparticles that have been subjected to a chemical process according to one illustrative embodiment.
Figure 3B:
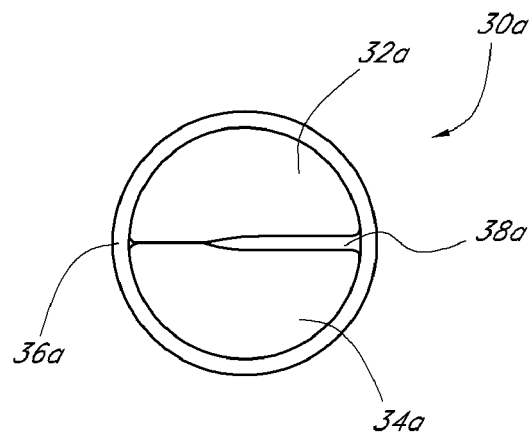

FIG. 3 depicts non-limiting examples of two nanoparticles that can be produced using the methods described herein. In FIG. 3A the two crystals are completely separated or unbonded, while in FIG. 3B they are partially separated or unbonded. FIG. 3A depicts a resultant nanoparticle 30 that has two crystals 32 and 34 that are at least partially surrounded or entirely surround by an outer layer 36. The crystals 32 and 34 are completely separated from each other to form a gap 38 there between. These crystals were bonded each other before the chemical reaction.

Alternatively, FIG. 3B depicts a processed nanoparticle 30a having crystals that are partially separated from each other at the interface. The nanoparticle 30a has two crystals 32a and 34a that contact each other. The nanoparticle 30a also has a partial gap 38a between crystals 32a and 34a.

In certain embodiments, each of two or more metal oxide crystals forms a single magnetic domain. In one embodiment, a magnetic domain of one of the two or more metal oxide crystals has a magnetization direction different from those of others of the two or more metal oxide crystals.

Although the particles depicted in the drawings generally are circular, it should be noted that nanoparticles to be chemically produced or the resultant nanoparticles may have any shape. Nanoparticle shapes include, but are not limited to, for example, sphere, cylinder, cube, oval, cone, rectangular prism, polyhedron, and the like.

Methods of Determining Nanoparticle Crystallinity

Aspects of the present disclosure relate to methods of determining nanoparticle crystallinity. Nanoparticles processed according to the methods described herein can be used to determine (or test) the crystallinity of nanoparticle samples. As such, aspects of the present disclosure can be used to quantify the crystallinity and/or quality of nanocrystals (e.g., where single crystallinity is indicative of quality).

In one embodiment, inorganic nanoparticles can be processed using a process described herein and other etching process. The inorganic nanoparticles can include one or more nanoparticles of metal oxides, metals, or metal chalcogenides. For example, metal oxide nanoparticles can be processed as described herein. The processed particles can be imaged or otherwise identified, and the relative number of poly and monocrystal nanoparticles can be determined.

In certain aspects, a representative sample of a batch of nanoparticles can be processed and analyzed. For example, a sample of nanoparticles from a batch can be taken and subjected to chemical processing as described herein. For example, where 1 kg of metal oxide is produced in a single batch, 1 mg of nanoparticles can be taken as a test sample for use in identifying crystallinity of nanoparticles produced in the single batch. The sample can be processed, then the amounts of mono and/or polycrystal nanoparticles determined for the sample. The determined amounts for the sample can be further extrapolated to determine the crystallinity of the entire batch.

Again referring to FIG. 2, processed polycrystalline nanoparticles 24 can be quantified, for example, after being imaged using e.g. TEM. For example, FIG. 2 depicts two polycrystalline nanoparticles and eight single crystalline nanoparticles. In this example, the proportion of the single crystalline nanoparticles in the imaged sample is 80%. In one embodiment, among hundreds of nanoparticles, the number of single crystalline nanoparticles or polycrystalline nanoparticles can be counted, and then, ratio or proportion of single crystalline nanoparticles with respect to polycrystalline nanoparticles can be computed. This proportion can be used or extrapolated to represent the quantitative quality of nanoparticles, for example, all of the nanoparticles produced in a single batch. Thus, in some aspects, a representative sample can be quantified and used to extrapolate the quantitative quality of an entire batch of nanoparticles.

Polycrystal Catalysts

Certain aspects relate to nanoparticles that can be processed and used as catalysts. The above described chemical processing of a polycrystalline nanoparticle can be used to produce resultant nanoparticles with at least two crystals which are at least partially separated from each other at the interfaces. To obtain the resultant nanoparticles, two or more polycrystalline nanoparticles are used as the starting material. In one embodiment, these resultant nanoparticles can be used for carrying catalyst material which will be described below in connection with FIG. 4.

Figure 4A:
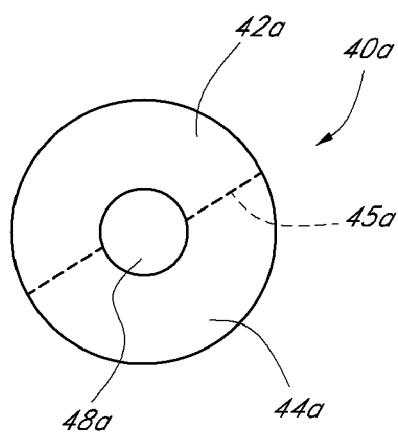
FIG. 4A shows a nanoparticle that is to be subjected to a chemical process according to one illustrative embodiment and FIG. 4B schematically shows an illustrative nanoparticle including a catalyst material that has been processed according to an illustrative embodiment.

FIG. 4A depicts an unprocessed nanoparticle 40a that includes crystals 42a and 44a bonded each other at an interface 45a thereof. Embedded between, and surrounded by, crystals 42a and 44a is a catalyst material 48a, for example, a noble or other catalytic metal such as gold, platinum, nickel and the like. In its embedded state, the catalyst material is inaccessible and therefore cannot participate in catalysis. The splitting process described herein can be used to at least partially separate the crystals 42a and 44a, thereby exposing the catalyst material.

Figure 4B:
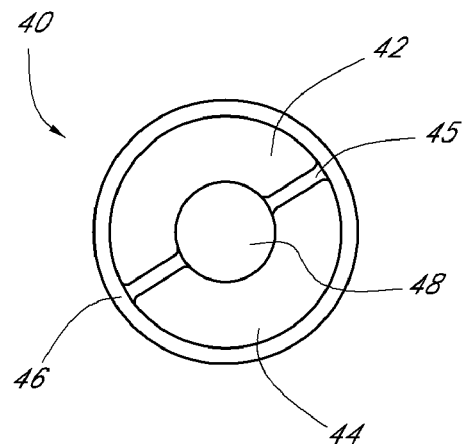

FIG. 4B depicts an illustrative example of a resultant, processed nanoparticle 40, which includes crystals 42 and 44 that are completely separated from each other and provide a gap 45 there between. In the illustrated example, the crystals 42 and 44 are completely separated at the interfaces thereof. Alternatively, in some aspects, the crystals 42 and 44 are partially separated such that there may only be a partial gap. Referring to FIG. 4B, in the illustrated embodiment, an outer layer 46 at least partially surrounds the crystals 42 and 44 to maintain integrity of the nanoparticle 40. It should be noted that in some aspects the outer layer optionally can be removed by a further chemical process using, for example, an acidic solution. A catalyst material 48, for example, a metal is interposed between the crystals 42 and 44. In the illustrated embodiment, the metal 48 is bonded to the crystals 42 and 44. Alternatively, in another embodiment, the metal is not bonded to the metal oxide crystals. The catalyst material 48 can be accessible from outside the nanoparticle 40 via the gap 45. In one embodiment, the catalyst material 48 can include, but is not limited to, a noble metal, for example. In some embodiments, the catalyst material 48 can be one or more of palladium, platinum, gold, silver, cobalt and combinations thereof. A population of the nanoparticles 40 can be used as a catalyst in a chemical process, for example, hydrogenation process, Suzuki coupling reaction, and Heck coupling reaction. The catalyst can be collected after using by way of applying magnetic field or flux.

Still some aspects of the disclosure relate to kits for processing and/or analyzing nanoparticles. The kits can include one or more of a surfactant, an etchant and a catalyst. The catalyst can include, for example, a catalytic metal such as a noble metal. Some specific examples include at least one of palladium, gold, silver, platinum, nickel, combinations of the foregoing and molecules incorporating the foregoing. The etchant compound can include one or more of trialkylphosphine, triarylphosphine, trioctylphosphine, and the like. The surfactant can include an amine or other surfactant. The kit may further include at least one container mixing of at least two of the surfactant compound, the etchant compound and the catalyst. The kit also may include protocols or procedures for utilizing the components of the kit in processing, analyzing, and/or utilizing nanoparticles.

EXAMPLES

Example 1

Figures 5A, 5B:
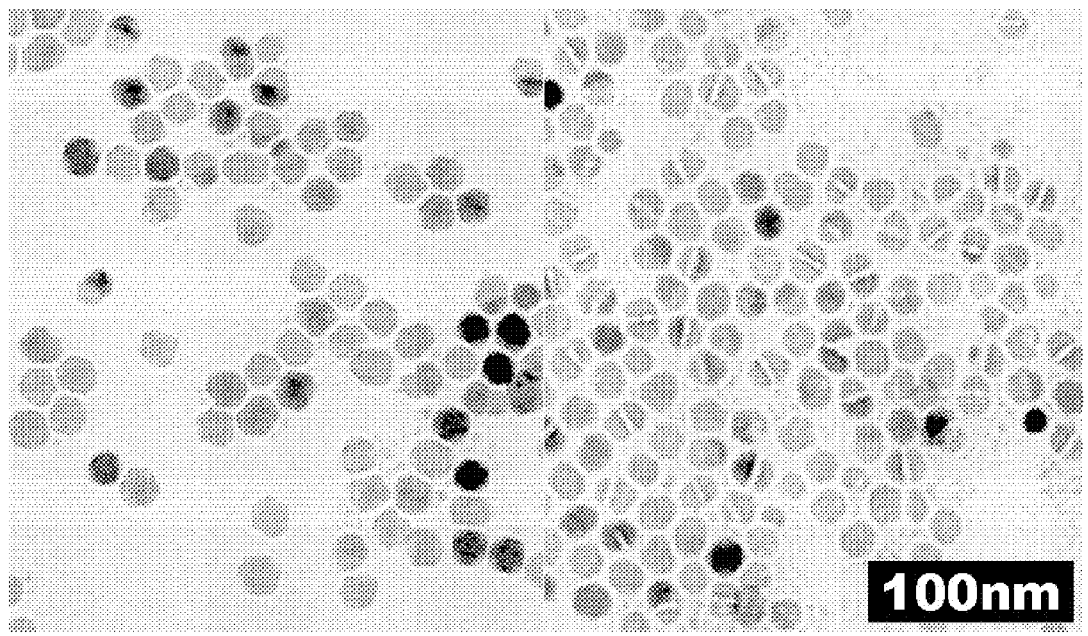
FIG. 5A is a TEM image of $Fe_3O_4$ nanoparticles to be processed and FIG. 5B is a TEM image of $Fe_3O_4$ nanoparticles that have been processed as described in Example 1.

$Fe_3O_4$ nanoparticles were synthesized using a process described in Sun et al., J. AM. CHEM. SOC. 2002, volume 124, pp. 8204-8205, which is incorporated herein by reference in its entirety. FIG. 5A shows the synthesized nanoparticles.

The nanoparticles were then processed as follows: A sonicated slurry of the $Fe_3O_4$ nanoparticles (50.0 mg) in oleylamine (18 mL, Aldrich, technical grade) was prepared in a 100 mL Schlenk tube, which was connected to a bubbler. $Pd(acac)_2$ (5.0 mg) dissolved in trioctylphosphine (TOP; 2 mL, Aldrich, 90%) were added to the slurry, and the resulting solution was heated at 300° C. in an oil bath for 1.5 hours to give a dark brown solution. During the reaction, the reaction mixture was constantly purged with a gentle stream of $N_2$. The brown precipitates, formed by adding methanol, were collected by centrifugation.

In FIG. 5B, the TEM image of the processed nanoparticles shows that more than 50% of $Fe_3O_4$ nanocrystals are split in the middle with an about 2~3 nm gap and the split nanoparticles are joined by a thin, amorphous layer.

Example 2

Figure 6A:
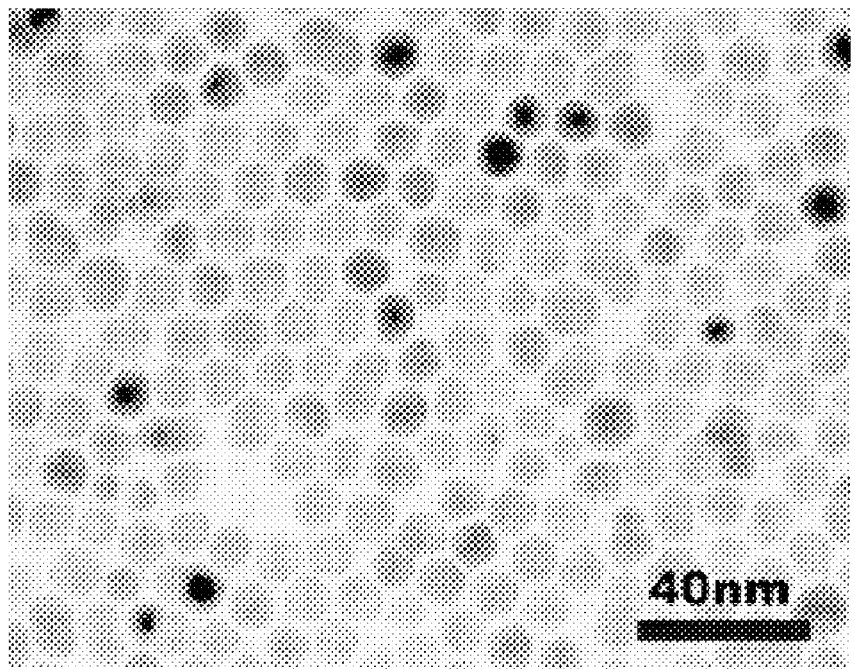
FIG. 6A is a TEM image of $Fe_2O_3$ nanoparticles to be processed and FIG. 6B is a TEM image of $Fe_2O_3$ nanoparticles that have been processed as described in Example 2.
Figure 6B:
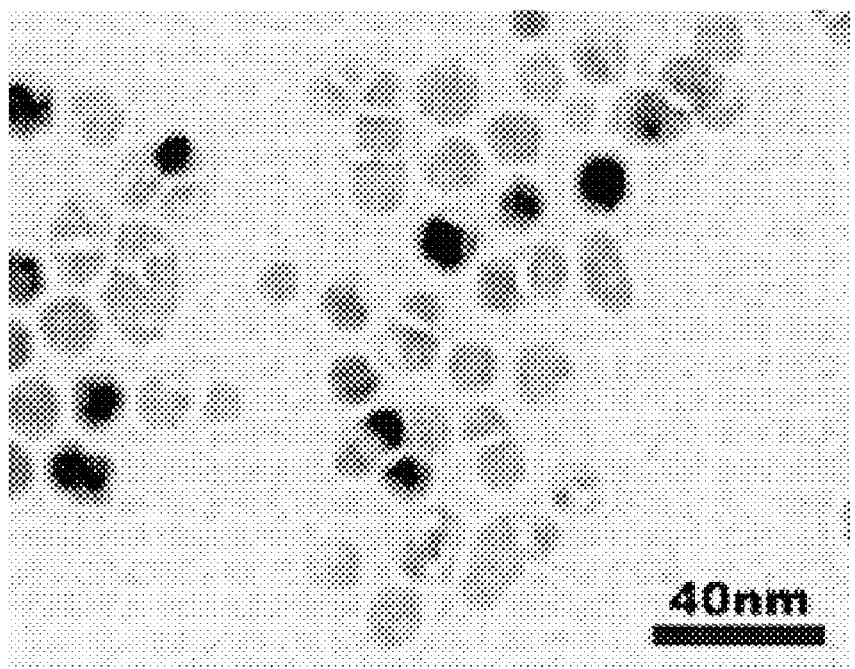

$Fe_2O_3$ nanoparticles were synthesized using a process described in Yang et al., J. AM. CBEM. SOC. 2003, volume 125, p. 630, which is incorporated herein by reference in its entirety. FIG. 6A shows the synthesized nanoparticles. The $Fe_2O_3$ nanoparticles were processed using the process described in Example 1. In FIG. 6B, the TEM image shows separated crystals.

Example 3

Figure 7A:
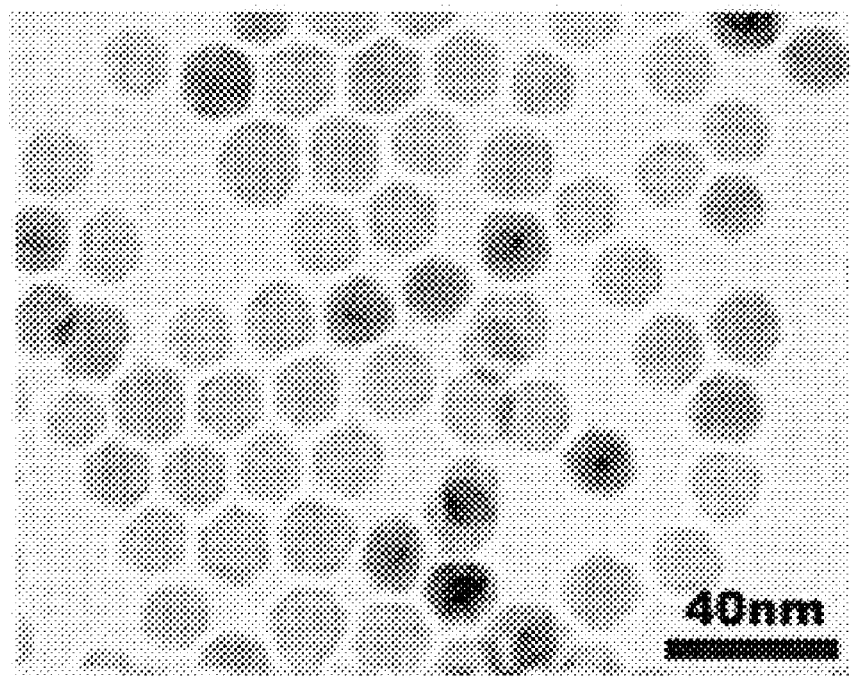
FIG. 7A is a TEM image of $MnFe_2O_4$ nanoparticles to be processed and FIG. 7B is a TEM image of $MnFe_2O_4$ nanoparticles that have been processed as described in Example 3.
Figure 7B:
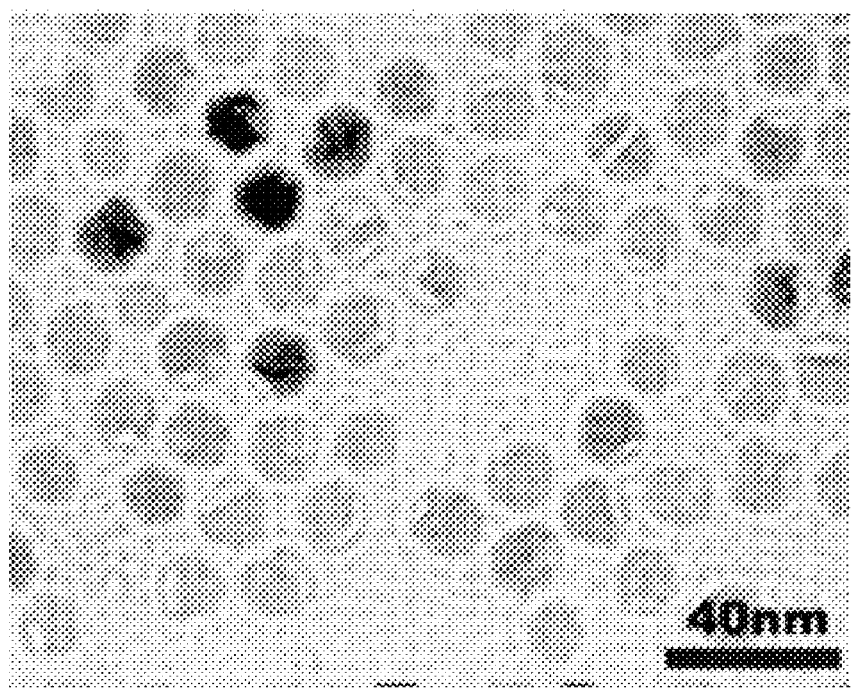

$MnFe_2O_4$ nanoparticles were synthesized using a process described in Sun et al., Adv. Funct. Mater., 2007, volume 17, p. 3870, which is incorporated herein by reference in its entirety. FIG. 7A shows the synthesized nanoparticles. The $MnFe_2O_4$ nanoparticles were processed using the process described in Example 1. In FIG. 7B, the TEM image shows separated crystals.

Example 4

Figure 8A:
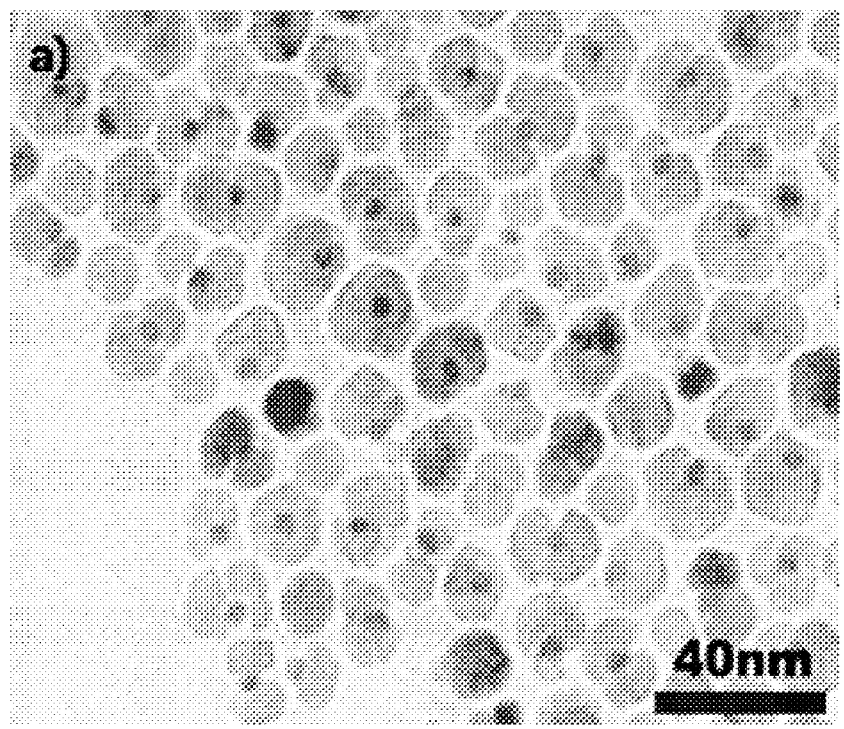
FIG. 8A is a TEM image of Pd—$Fe_3O_4$ combined nanoparticles to be processed and FIG. 8B is a TEM image of Pd—$Fe_3O_4$ combined nanoparticles that have been processed as described in Example 4.
Figure 8B:
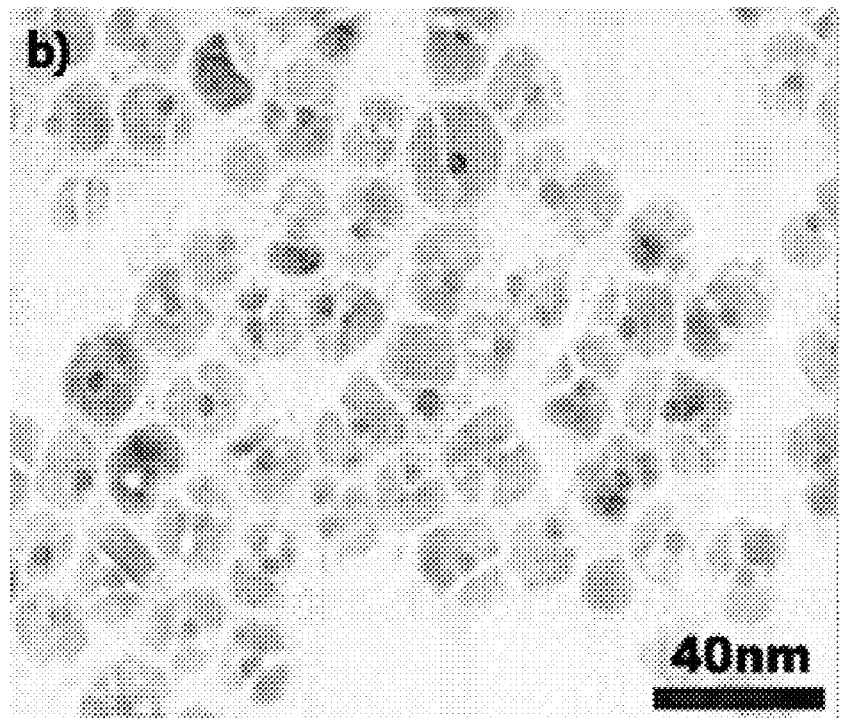

$Fe_3O_4$ nanoparticles having palladium surrounded by $Fe_3O_4$ were synthesized by employing Pd nanoparticles as seeds and forming Fe3O4 coating using a process described in Sun et al., J. AM. CBEM. SOC. 2002, volume 124, pp. 8204-8205, which is incorporated herein by reference in its entirety. FIG. 8A shows the synthesized nanoparticles. The nanoparticles were processed using the process described in Example 1. In FIG. 8B, the TEM image shows separated crystals.

In at least some of the aforesaid embodiments, one or more elements used in an embodiment can interchangeably be used in another embodiment unless such a replacement is not technically feasible. It will be appreciated by those skilled in the art that various other omissions, additions and modifications may be made to the methods and structures described above without departing from the scope of the claimed subject matter. All such modifications and changes are intended to fall within the scope of the subject matter, as defined by the appended claims.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g. bodies of the appended claims) are generally intended as "open" terms (e.g. the term "including" should be interpreted as "including but not z limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g. "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g. the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g. "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g. "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible sub-ranges and combinations of sub-ranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into sub-ranges as discussed above. Finally, as will be understood by one skilled in the art, a range includes each individual member. Thus, for example, a group having 1-3 particles refers to groups having 1, 2, or 3 particles. Similarly, a group having 1-5 particles refers to groups having 1, 2, 3, 4, or 5 particles, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of processing a polycrystalline nanoparticle, comprising:
    exposing a polycrystalline nanoparticle that includes at least two metal oxide crystallites bonded to each other to a composition, the composition including a catalyst including at least one selected from the group consisting of noble metal and transition metal, and
    at least partially separating the at least two metal oxide crystallites of the polycrystalline nanoparticle at an interface thereof.

2. The method of claim 1, wherein the catalyst is selected from the group consisting of palladium, gold, silver, platinum, nickel, combinations of the foregoing and molecules incorporating the foregoing.

3. The method of claim 1, wherein the composition further includes a first compound including an amine.

4. The method of claim 1, wherein the composition further includes a second compound of a formula: $PR_1R_2R_3$, wherein at least one of $R_1$, $R_2$ and $R_3$ is selected from the group consisting of an alkyl and an aryl.

5. The method of claim 1, wherein the composition further includes a second compound including one selected from the group consisting of trialkylphosphine, and triarylphosphine.

6. The method of claim 3, wherein the exposing includes:
    mixing the nanoparticle and the first compound to form a first mixture;
    forming a second mixture of the catalyst and a second compound of a formula: $PR_1R_2R_3$, wherein at least one of $R_1$, $R_2$ and $R_3$ is selected from the group consisting of an alkyl and an aryl; and
    mixing the first mixture and the second mixture to form a third mixture.

7. The method of claim 6, wherein the exposing further includes heating the third mixture to have a temperature of about 50° C. to about 400° C.

8. The method of claim 3, wherein the first compound includes aliphatic amine.

9. The method of claim 1, wherein the catalyst includes metal nanoparticles.

10. The method of claim 1, wherein the catalyst includes a nanoparticle of one selected from the group consisting of palladium, gold, silver, platinum, nickel, palladium-gold, and palladium-platinum.

11. The method of claim 1, wherein the exposing includes forming an outer layer of the nanoparticle.

12. The method of claim 1, wherein the nanoparticle includes one or more transition metal oxide.

13. The method of claim 1, wherein the nanoparticle includes a metal bonded to at least one of the at least two metal oxide crystallites.

14. A method of determining nanoparticle crystallinity, comprising;
exposing a population of nanoparticles to a composition, the composition including a catalyst including at least one selected from the group consisting of noble metal and transition metal, wherein said population of nanoparticles includes one or more of one or more single crystalline nanoparticles or one or more polycrystalline nanoparticles, and wherein the polycrystalline nanoparticles, if present, include at least two metal oxide crystallites bonded to each other;
at least partially separating the at least two metal oxide crystallites of the polycrystalline nanoparticles, if present in the population; and
identifying one or more of single crystalline nanoparticles or polycrystalline nanoparticles within the population of nanoparticles.

15. The method of claim 14, wherein the catalyst includes at least one selected from the group consisting of palladium, gold, silver, platinum, nickel, combinations of the foregoing and molecules incorporating the foregoing.

16. The method of claim 14, wherein the composition further includes a first compound including an amine.

17. The method of claim 14, wherein the composition further includes a second compound of a formula: $PR_1R_2R_3$, wherein at least one of $R_1$, $R_2$ and $R_3$ is selected from the group consisting of an alkyl and an aryl.

18. The method of claim 14, wherein the composition further includes a second compound including one selected from the group consisting of selected from the group consisting of trialkylphosphine, triarylphosphine, and trioctylphosphine.

19. The method of claim 16, wherein the first compound includes aliphatic amine.

20. The method of claim 14, wherein identifying includes counting polycrystalline nanoparticles within the population of nanoparticles.

21. The method of claim 14, wherein the nanoparticles include at least one metal oxide crystallite.

22. The method of claim 21, wherein the nanoparticles include a metal oxide selected from the group consisting of $Fe_2O_3$, $Fe_3O_4$, $MnFe_2O_3$, $Mn_2O_3$ and $CoO$.

23. The method of claim 14, wherein the population of nanoparticles does not include a polycrystalline nanoparticle.

24. A nanoparticle comprising:
at least two metal oxide crystals; and
an outer layer at least partially surrounding the at least two metal oxide crystals such that the at least two metal oxide crystals and the layer form a single nanoparticle, wherein the at least two metal oxide crystals are unbonded to each other.

25. The nanoparticle of claim 24, wherein each of the at least two metal oxide crystals includes a transition metal oxide.

26. The nanoparticle of claim 24, wherein the at least two metal oxide crystals are spaced from each other.

27. The nanoparticle of claim 24, wherein the outer layer surrounds the at least two metal oxide crystals.

28. The nanoparticle of claim 24, further comprising a metal interposed between the at least two metal oxide crystals.

29. The nanoparticle of claim 28, wherein the metal includes a noble metal.

30. The nanoparticle of claim 28, wherein the metal includes one selected from the group consisting of palladium, platinum, gold, silver and cobalt.

31. A catalyst comprising the nanoparticles of claim 28.

32. A method of determining nanoparticle crystallinity, comprising;
exposing a population of inorganic nanoparticles to an etchant, wherein said population of inorganic nanoparticles includes one or more of one or more single crystalline nanoparticles or one or more polycrystalline nanoparticles and wherein the polycrystalline nanoparticles, if present, include at least two crystallites bonded to each other;
at least partially separating the at least two crystallites of the polycrystalline nanoparticles, if present in the population; and
identifying one or more of single crystalline nanoparticles or polycrystalline nanoparticles within the population of inorganic nanoparticles.

33. The method of claim 32, wherein the inorganic nanoparticles include one or more nanoparticles selected from the group consisting of metal oxides, metals, and metal chalcogenides.

* * * * *

UNITED STATES PATENT AND TRADEMARK OFFICE
CERTIFICATE OF CORRECTION

| | | |
|---|---|---|
| PATENT NO. | : 7,816,297 B2 | Page 1 of 1 |
| APPLICATION NO. | : 12/201990 | |
| DATED | : October 19, 2010 | |
| INVENTOR(S) | : Kwangyeol Lee | |

It is certified that error appears in the above-identified patent and that said Letters Patent is hereby corrected as shown below:

On page 1, under Other Publications, line 4 change "crysal Cr203" to --crystal Cr2O3--.

On page 1, under Other Publications, change "Artifically" to --Artificially--.

On page 2, under Other Publications, change "In203" to --In2O3--.

At column 1, line 4, change "BAGROUND" to --BACKGROUND--.

At column 4, line 58, change "hereof" to --hereof.--.

At column 7, line 2, change "and or" to --and/or--.

At column 10, line 43, change "CBEM." to --CHEM.--.

At column 10, line 65, change "CBEM." to --CHEM.--.

At column 11, line 21, change "(e.g." to --(e.g.,--.

At column 11, line 23, change "(e.g." to --(e.g.,--.

At column 11, line 24, after "but not" delete "z".

At column 11, line 40, change "(e.g." to --(e.g.,--.

At column 11, line 46, change "(e.g." to --(e.g.,--.

At column 11, line 52, change "(e.g." to --(e.g.,--.

At column 11, line 59, change "(e.g." to --(e.g.,--.

At column 13, line 21, in Claim 14, change "comprising;" to --comprising:--.

At column 13, lines 48-49, in Claim 18, after "including one" delete "selected from the group consisting of".

At column 14, line 35, in Claim 32, change "comprising;" to --comprising:--.

At column 14, line 40, in Claim 32, change "nanoparticles" to --nanoparticles,--.

Signed and Sealed this
Thirty-first Day of May, 2011

David J. Kappos
*Director of the United States Patent and Trademark Office*